United States Patent
Kim

(10) Patent No.: US 12,034,133 B1
(45) Date of Patent: Jul. 9, 2024

(54) AUTOMATED BATTERY DISASSEMBLY SYSTEM

(71) Applicant: KOREA ZINC CO., LTD., Seoul (KR)

(72) Inventor: Seung Hyun Kim, Ulsan (KR)

(73) Assignee: KOREA ZINC CO., LTD. (KR)

( * ) Notice: Subject to any disclaimer, the term of this patent is extended or adjusted under 35 U.S.C. 154(b) by 0 days.

(21) Appl. No.: 18/472,380

(22) Filed: Sep. 22, 2023

Related U.S. Application Data

(63) Continuation of application No. PCT/KR2023/011591, filed on Aug. 7, 2023.

(30) Foreign Application Priority Data

May 3, 2023 (KR) .................. 10-2023-0057900

(51) Int. Cl.
  *H01M 10/54* (2006.01)
  *B09B 3/30* (2022.01)
  *B09B 101/16* (2022.01)
  *B23P 19/04* (2006.01)

(52) U.S. Cl.
  CPC .............. *H01M 10/54* (2013.01); *B09B 3/30* (2022.01); *B23P 19/04* (2013.01); *B09B 2101/16* (2022.01)

(58) Field of Classification Search
  CPC ........... H01M 10/54; B09B 3/30; B23P 19/04
  See application file for complete search history.

(56) References Cited

U.S. PATENT DOCUMENTS

| 2021/0053230 A1 | 2/2021 | Mizoguchi et al. |
| 2022/0241963 A1 | 8/2022 | Mizoguchi et al. |

FOREIGN PATENT DOCUMENTS

| CN | 206716705 U | 12/2017 |
| CN | 108461856 A | 8/2018 |
| CN | 114744321 A | 7/2022 |
| CN | 115621595 A | 1/2023 |
| CN | 115783764 A | 3/2023 |
| CN | 115911631 A | 4/2023 |

(Continued)

OTHER PUBLICATIONS

Zorn, M. et al., "An Approach for Automated Disassembly of Lithium-Ion Battery Packs and High-Quality Recycling Using Computer Vision, Labeling, and Material Characterization," Recycling 2022, 7, 48, 24 pages.

*Primary Examiner* — Joel D Crandall
(74) *Attorney, Agent, or Firm* — HSML P.C.

(57) ABSTRACT

An automated battery disassembly system according to one embodiment includes: a workstation including a first worktable, a second worktable, a third worktable, and a discharging worktable; a discharging device; a robot device; a transfer device; and a controller electrically connected to the robot device and the transfer device. The controller is configured to control the robot device to: when a battery pack is disposed on the first worktable, separate an upper cover from the battery pack; when the battery pack is disposed on the discharging worktable, discharge the battery pack by connecting the battery pack to the discharging device; when the discharged battery pack is disposed on the second worktable, separate a battery module from the discharged battery pack; and when the battery module is disposed on the third worktable, separate battery cells from the battery module.

8 Claims, 6 Drawing Sheets

(56) References Cited

FOREIGN PATENT DOCUMENTS

| | | | |
|---|---|---|---|
| JP | 20210330431 A | | 3/2021 |
| KR | 20200043844 A | * | 4/2020 |
| KR | 102175706 B1 | | 11/2020 |
| KR | 102334865 B1 | * | 12/2021 |
| KR | 102409527 B1 | | 6/2022 |
| KR | 102512096 B1 | | 3/2023 |
| KR | 102519579 B1 | | 4/2023 |
| RU | 2767310 C1 | | 3/2022 |
| TW | M549178 U | | 9/2017 |

* cited by examiner

| Waste battery pack before disassembling |||
|---|---|---|
|  |||
| Upper cover of battery pack | Waste battery pack interior | Lower cover of battery pack |
|  |  |  |
| Separated cables/ wires | Internal parts of battery pack | Separated battery module |
|  |  |  |
| Both end cut parts of battery module | Battery module cover | Battery cell |
|  |  |  |
| Battery cell cover || Finally separated battery cell |
|  ||  |

AUTOMATED BATTERY DISASSEMBLY SYSTEM

TECHNICAL FIELD

The present disclosure relates to an automated battery disassembly system. More specifically, the present disclosure pertains to a method for automatically disassembling a battery pack or a battery module used in an electric vehicle or an energy storage device.

BACKGROUND

Recently, a lithium-ion battery is used in electric vehicles and may be composed of four elements, i.e., a cathode material, an anode material, an electrolyte, and a battery separator. A nickel ternary (Li—Co or Li—Mn) battery and a lithium iron phosphate battery using iron instead of cobalt are used depending on the material used as a cathode material. A variety of batteries including an all-solid-state battery are expected to be used in order to reduce the fire hazard of an electrolyte.

Secondary batteries account for 30% of the life cycle's carbon footprint of electric vehicles. Metal materials such as nickel, cobalt, and manganese account for a high carbon footprint. Most of carbon are generated in the mining and refining process of raw materials. The reuse and recycling of secondary batteries may make a great contribution to reducing greenhouse gas emissions for the transition to a carbon-neutral society by 2050.

In the future, as the amount of waste batteries discarded after several years of use increases with the growth of the electric vehicle market, the battery recycling industry for recycling and reuse of waste batteries will be expanded. By recovering and recycling valuable metals (nickel, cobalt, manganese, copper, lithium, etc.) essential for battery manufacture through this battery recycling, it is possible not only to achieve resource recycling and economic benefit creation, but also to reduce the environmental pollution caused by the metal harvesting process.

Conventionally, in order to recycle and reuse a waste battery pack, a worker has to directly disassemble the battery pack using a tool, extract and discharge a battery module. At this time, the battery discharge is performed using saline water. This saline water discharge method uses saline water obtained by diluting sodium chloride (NaCl) or calcium chloride ($CaCl_2$)) with water at a concentration of 3% to 3.5%. The saline water discharge method takes a long time from at least 8 hours to 10 days or more. Care should be taken because fire and explosion accidents may occur during the saline water discharge process. Heavy metal leakage and wastewater treatment may result in high costs, and may require a large workspace. The saline-water-discharged battery module has to be dried and then directly disassembled again to extract battery cells.

Since most of the conventional battery pack recycling methods described above are performed manually, they are very inefficient and time-consuming. In addition, a large number of people are required for disassembly works, and there is a high risk of workers being exposed to harmful environments, which may cause various problems.

SUMMARY

An object of the present disclosure is to provide an automated battery disassembly system capable of solving the above problems.

According to one embodiment, an automated battery disassembly system includes: a workstation including a first worktable, a second worktable, a third worktable, and a discharging worktable; a discharging device; a robot device; a transfer device; and a controller electrically connected to the robot device and the transfer device, wherein the controller is configured to control the robot device to: when a battery pack is disposed on the first worktable, separate an upper cover from the battery pack; when the battery pack is disposed on the discharging worktable, discharge the battery pack by connecting the battery pack to the discharging device; when the discharged battery pack is disposed on the second worktable, separate a battery module from the discharged battery pack; and when the battery module is disposed on the third worktable, separate battery cells from the battery module.

The controller may be configured to control the transfer device to: after the separating the upper cover from the battery pack and before the discharging the battery pack, transfer the battery pack which is disposed on the first worktable and from which the upper cover is separated to the discharging worktable; after the discharging the battery pack and before the separating the battery module from the discharged battery pack, transfer the discharged battery pack disposed on the discharging worktable to the second worktable; and after the separating the battery module from the discharged battery pack and before the separating the battery cells from the battery module, transfer the battery module disposed on the second worktable to the third worktable.

The system may further include: a fire extinguishing device including a water tank connected to the controller and configured to be filled with fire extinguishing water, wherein the controller may be configured to control the fire extinguishing device to accommodate the battery pack disposed on the workstation into the water tank.

The system may further include: a vision system electrically connected to the controller, wherein the controller may be configured to disassemble components of the battery pack disposed on the workstation by controlling the robot device based on data obtained through the vision system.

The system may further include: a storage box, wherein the controller may be configured to control the robot device to move the components separated from the battery pack to the storage box.

The discharging device may include a discharger and a short-circuiting discharge jig, and the controller may be configured to control the robot device to connect the battery pack disposed on the discharging worktable to the discharger to discharge the battery pack, and then control the robot device to connect the battery pack to the short-circuiting discharge jig to short-circuit-discharge the battery pack.

The controller may be configured to discharge the battery pack by using the discharger for 1 hour to 4 hours according to a residual energy of the battery pack so that a voltage of the battery pack is 30 V or less, and to discharge the battery pack by using the short-circuiting discharge jig so that the voltage of the battery pack is 0.2 V or less.

The battery module may include a plurality of battery cells arranged in a first direction, each of the battery cells may include a body extending in a longitudinal direction perpendicular to the first direction and electrode leads extending from longitudinal ends of the body, and the separating the battery cells from the battery module may include cutting the battery module along a line parallel to the first direction and passing over the electrode leads when the battery module is viewed from above.

The automated battery disassembly system according to the present disclosure is capable of minimizing the input of workers during a waste battery disassembling work, automatically disassembling and separating a battery pack and a battery module using a robot device and a automation device, avoiding exposure of workers to harmful environments, improving a waste battery disassembly ability, and minimizing the number of workers. Furthermore, the automated battery disassembly system according to the present disclosure is capable of enhancing the battery disassembly productivity.

DETAILED DESCRIPTION

Figure 1:
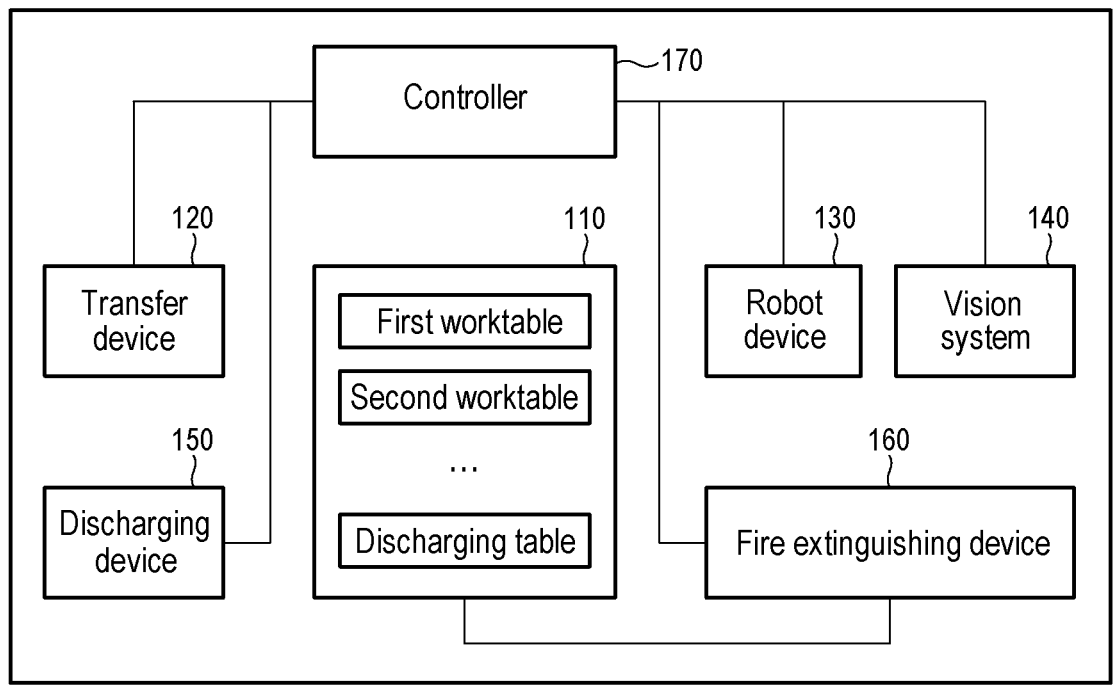
FIG. 1 is a configuration diagram of an automated battery disassembly system according to one embodiment.

Embodiments of the present disclosure are illustrated for describing the technical scope of the present disclosure. The scope of the claims according to the present disclosure is not limited to the embodiments described below or to the detailed descriptions of these embodiments.

All technical or scientific terms used herein have meanings that are generally understood by a person having ordinary knowledge in the art to which the present disclosure pertains, unless otherwise specified. The terms used herein are selected for only more clear illustration of the present disclosure, and are not intended to limit the scope of claims in accordance with the present disclosure.

The expressions "include", "provided with", "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims.

The terms "first", "second", etc. used herein are used to identify a plurality of components from one another, and are not intended to limit the order or importance of the relevant components.

When a certain component is described as "coupled to" or "connected to" another component, this should be understood as having meaning that the certain component may be coupled or connected directly to the other component or that the certain component may be coupled or connected to the other component via a new intervening component.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Figure 2:
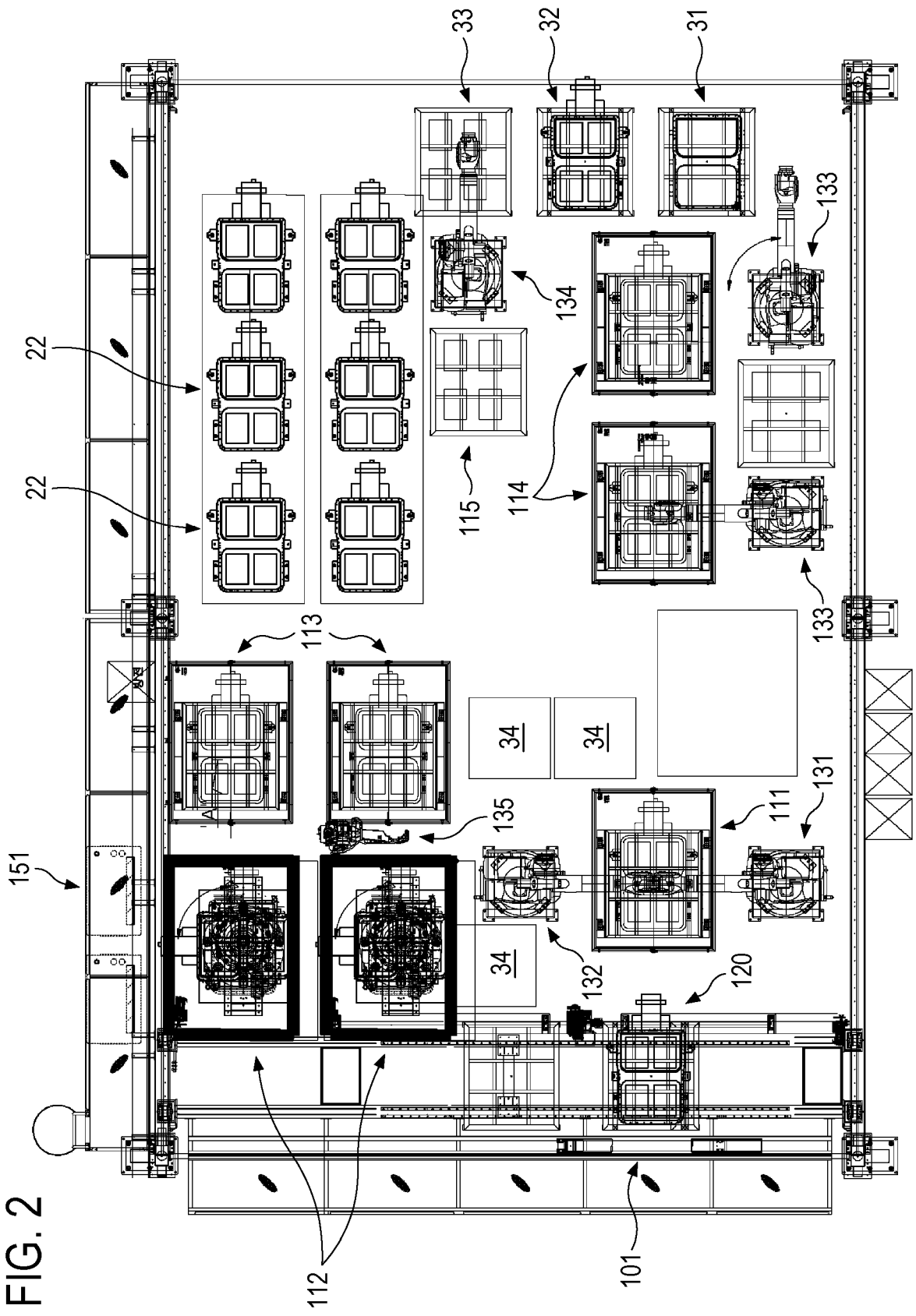
FIG. 2 is a plan view of the automated battery disassembly system according to one embodiment.
Figure 3:
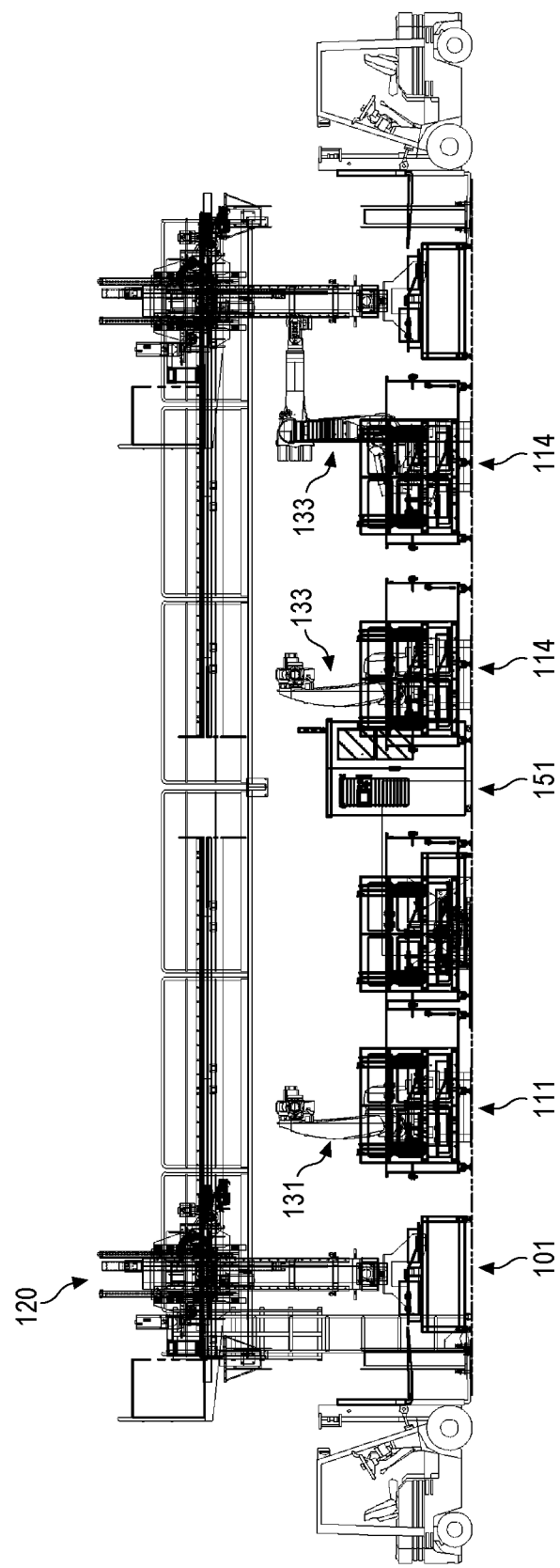
FIG. 3 is a side view of the automated battery disassembly system shown in FIG. 2.

FIG. 1 is a configuration diagram of an automated battery disassembly system 100 according to one embodiment. FIG. 2 is a plan view of the automated battery disassembly system 100 according to one embodiment. FIG. 3 is a side view of the automated battery disassembly system 100 shown in FIG. 2.

The automated battery disassembly system 100 is configured to disassemble a battery pack used in an electric vehicle or the like. The battery pack is disassembled to recycle or reuse the components inside the battery pack. By extracting battery cells from the battery pack, the materials constituting the battery cells can be recovered and recycled. Alternatively, the battery cells extracted from the battery pack may be reused for other purposes. For example, an energy storage system (ESS) may use the battery cells separated from the battery pack used in an electric vehicle.

The automated battery disassembly system 100 includes a workstation 110, a transfer device 120, and a robot device 130.

The workstation 110 is configured to allow the battery pack to be disposed thereon. The automated battery disassembly system 100 may include two or more worktables. For example, referring to FIG. 2, the workstation may include a plurality of worktables 111, 112, 113, 114, and 115. In the present disclosure, the workstation 110 may refer to each or all of the plurality of worktables 111, 112, 113, 114, and 115.

Different processes may be performed on different worktables. For example, when the battery pack is disposed on the first worktable 111, the upper cover of the battery pack may be disassembled, and when the battery pack is disposed on the second worktable 114, the battery cells may be separated from a battery module.

The workstation 110 may include discharging worktables 112 and 113. The discharging worktables are worktables where the battery pack is disposed in a process of discharging the battery pack. The battery pack transferred to the discharging worktables may be connected to a discharging device 150 and thereby the battery pack may be discharged.

The workstation 110 may include a first discharging worktable 112 manufactured in a turn-table structure and configured to be rotatable. The first discharging worktable 112 may rotate the battery pack to a position or direction suitable for discharging. Although discharging connectors in battery packs may be positioned variously depending on the manufacturer and model type, various types of battery packs can be handled by using the rotatable first discharging worktable 112.

A second discharging worktable 113 may be used as a standby place for the battery pack having been discharged by a discharger 151 before transferring the battery pack to a short discharging rack 22. In another embodiment, the workstation 110 may include a second discharging worktable 113 specialized for a battery pack of a specific model.

The automated battery disassembly system 100 may include two or more first discharging worktables 112 and two or more second discharging worktables 113. Referring to FIG. 2, two first discharging worktables 112 and two second discharging worktables 113 may be provided.

As well as the process of discharging the battery pack, other processes may also be performed on the discharging worktables 112 and 113. For example, after the battery pack is placed on the discharging worktables 112 and 113 and before the battery pack is discharged, the robot device 130 may separate and remove a battery management system (BMS) from the battery pack.

The transfer device 120 is configured to transfer the battery pack to the workstation 110 or move the battery pack disposed on the workstation 110 to another location. The transfer device 120 may include a gantry and a jig installed on the gantry. The transfer device 120 may clamp a battery pack or a component (e.g., a battery module) inside the battery pack using the jig installed on the gantry, and then may transfer the battery pack to another location. For example, the transfer device 120 may transfer the battery pack disposed on the first worktable 111 to the first discharging worktable 112. For another example, the transfer device 120 may transfer the battery module inside the battery pack disposed on the first worktable 111 to the second worktable 114.

The robot device 130 is a device for disassembling the battery pack, and may be configured to disassemble and separate components of the battery pack from the battery pack. For example, the robot device 130 may disassemble the battery pack using a robot arm and various tools (e.g., a bolt driver, laser cutter, tongs, saw, etc.) mounted on the robot arm. A laser cutting tool, a bolting processing tool, a cable cutting tool, a cover handling tool, a scrap handling tool, a cable handling tool, and the like are provided around the robot device 130. The robot device 130 may replace the tool coupled to the robot arm as needed. The robot device 130 may mount other components on the battery pack. For example, the robot device 130 may mount a discharging jig on the battery pack. The battery pack mounted with the discharging jig may be connected to a discharger and may be discharged.

The robot device 130 may be configured to transfer the components separated from the battery pack to another location. The robot device 130 may transfer the components (upper cover, lower cover, battery cell, etc.) disassembled from the battery pack to storage boxes (e.g., upper cover storage box 31, lower cover storage box 32, cell box 33, and dismantling box 34).

A plurality of robot devices 130 may be provided to disassemble the battery pack quickly and efficiently. For example, the robot device 130 includes a first robot 131 and a second robot 132 configured to perform works on an object disposed on the first worktable 111, a third robot 133 configured to perform works on an object disposed on the second worktable 114, a fourth robot 134 configured to perform works on an object disposed on the third worktable 115, and a fifth robot 135 configured to perform works on an object disposed on disposed on the discharging worktables 112 and 113. The arrangement and number of robots shown in FIG. 2 are nothing more than examples. In other embodiments, the robots may be arranged in other numbers or at other locations.

The automated battery disassembly system 100 may include a vision system 140. The vision system 140 may provide information necessary for controlling the movement of the robot device 130 in association with the robot device 130. The automated battery disassembly system 100 may control the robot device 130 based on the data acquired through the vision system 140 to disassemble components of the battery pack disposed on the workstation 110.

The vision system 140 captures images of the object of the robot device 130 with a camera, so that the robot device 130 can accurately perform works (e.g., removing bolts to remove the battery pack cover, cutting the cable inside the battery pack, cutting the battery module, etc.) on the object. In addition, the type of battery pack may be checked using the vision system 140, and the robot device 130 may re-perform necessary works based on the result of check.

The vision system 140 may be provided for each robot device 130 or for each worktable. For example, the vision system 140 may be provided in each of the plurality of robot devices 130 provided in the automated battery disassembly system 100. In FIG. 1, the robot device 130 and the vision system 140 are shown as separate blocks for the sake of convenience of description. However, the vision system 140 may be provided as a part of the robot device 130. Unless otherwise specified, it should be understood that the works of disassembling and separating the battery pack or battery module by the robot device 130 are performed using the vision system 140.

The automated battery disassembly system 100 may include a discharging device 150. The battery pack can be safely disassembled by discharging the battery pack before separating the components inside the battery pack (e.g., battery modules, battery cells, and battery management system (BMS)). The discharging device 150 may include a discharger 151 for forcibly discharging the battery pack and a short-circuiting discharge jig configured to short-circuit the battery pack. The short-circuiting discharge jig is a jig composed of a bus bar and a cable, and is configured to short-circuit the (+) terminal and (−) terminal of the battery pack. The short-circuiting discharge jig may be mounted on the battery pack by the robot device 130.

The automated battery disassembly system 100 may include a fire extinguishing device 160. The fire extinguishing device 160 may extinguish a fire when a fire occurs in the battery pack disposed on the workstation 110. The fire extinguishing device 160 includes a water tank configured to be filled with fire extinguishing water, so that the workstation can be accommodated in the water tank when a fire occurs. A fire can be extinguished by accommodating the workstation 110 into the water tank filled with water. Accommodating the workstation 110 in the water tank in the present disclosure means that the worktables constituting the workstation enters the water tank. The fire extinguishing device 160 may include a fire detection sensor, and may accommodate the worktables in the water tank based on a signal acquired through the fire detection sensor. In the present disclosure, the fire detection sensor is nothing more than an example of a means for detecting a fire, and a fire may be detected by a component other than the fire detection sensor provided in the fire extinguishing device.

The water tank may be provided under the workstation 110. When a fire occurs in the battery pack, the piston supporting the worktables descends, so that the workstation 110 and the battery pack on the workstation 110 can be submerged in the water tank. If the fire continues, low-temperature extinguishing water may be additionally supplied from the outside to the water tank. The fire extinguishing device 160 may include a drainage part for draining the fire extinguishing water in the water tank to the outside. The drained fire extinguishing water may be cooled again and introduced into the water tank. The fire extinguishing device 160 may include a temperature sensor. The fire extinguishing device 160 may measure the temperature of the fire extinguishing water in the water tank using the temperature sensor, and may supply low-temperature fire extinguishing water to the water tank based on the measured temperature.

The automated battery disassembly system 100 includes a controller 170. The controller 170 controls an operation of controlling the automated battery disassembly system 100. For example, the controller 170 may control the disassembly of the battery pack by the robot device 130, the transfer of the battery pack or the components of the battery pack by the transfer device 120, the operation of the fire extinguishing device 160, and the like. The controller 170 is not limited to one physical control device, and may be understood to be a concept including all control devices involved in controlling the automated battery disassembly system 100. For example, the fire extinguishing device 160 may include its own control device that controls the operation of the fire extinguishing device 160, and although the controller 170 is shown as a block separate from the fire extinguishing device 160 in FIG. 1, it may be understood that the controller 170 includes a control device for the fire extinguishing device 160.

The automated battery disassembly system 100 according to the present disclosure will be described as being used in a method or process of disassembling a battery pack. However, the automated battery disassembly system may be used not only in disassembling the battery pack but also in disassembling various types of energy storage devices (e.g., battery modules) including secondary batteries.

The automated battery disassembly system 100 described with reference to FIGS. 2 and 3 is nothing more than an example, and may be implemented in an appropriate form depending on the location where the system is to be installed or the type of battery pack handled by the system.

Figure 4:
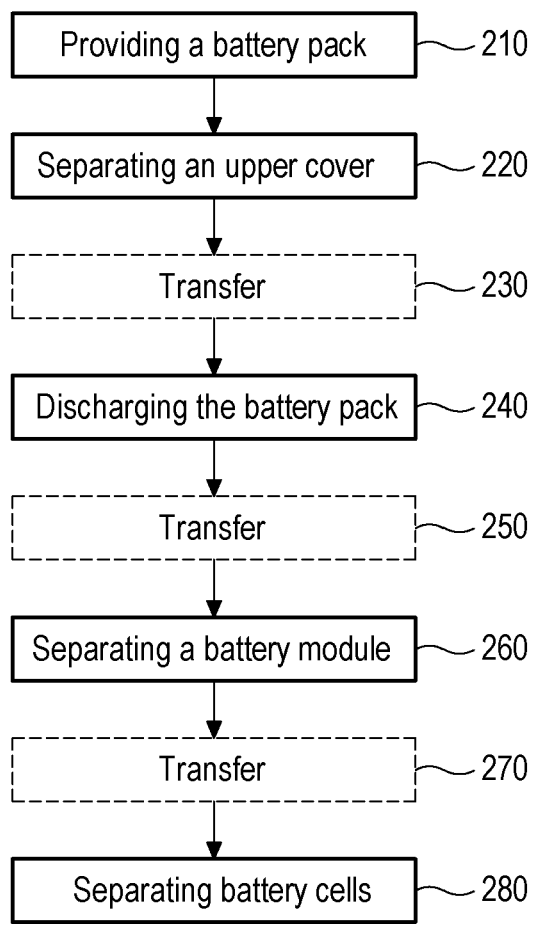
FIG. 4 is a flowchart of an automated battery disassembly method according to one embodiment.
Figure 5:
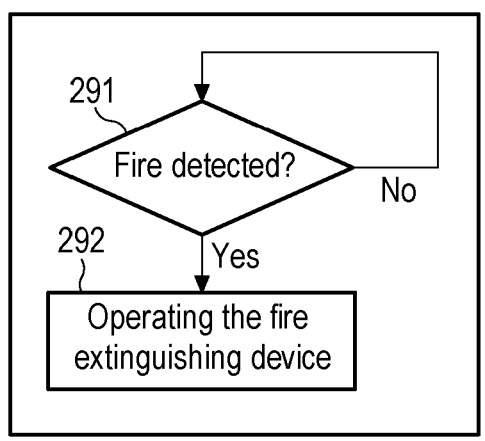
FIG. 5 is a view showing a fire monitoring process performed at each worktable.
Figure 6:
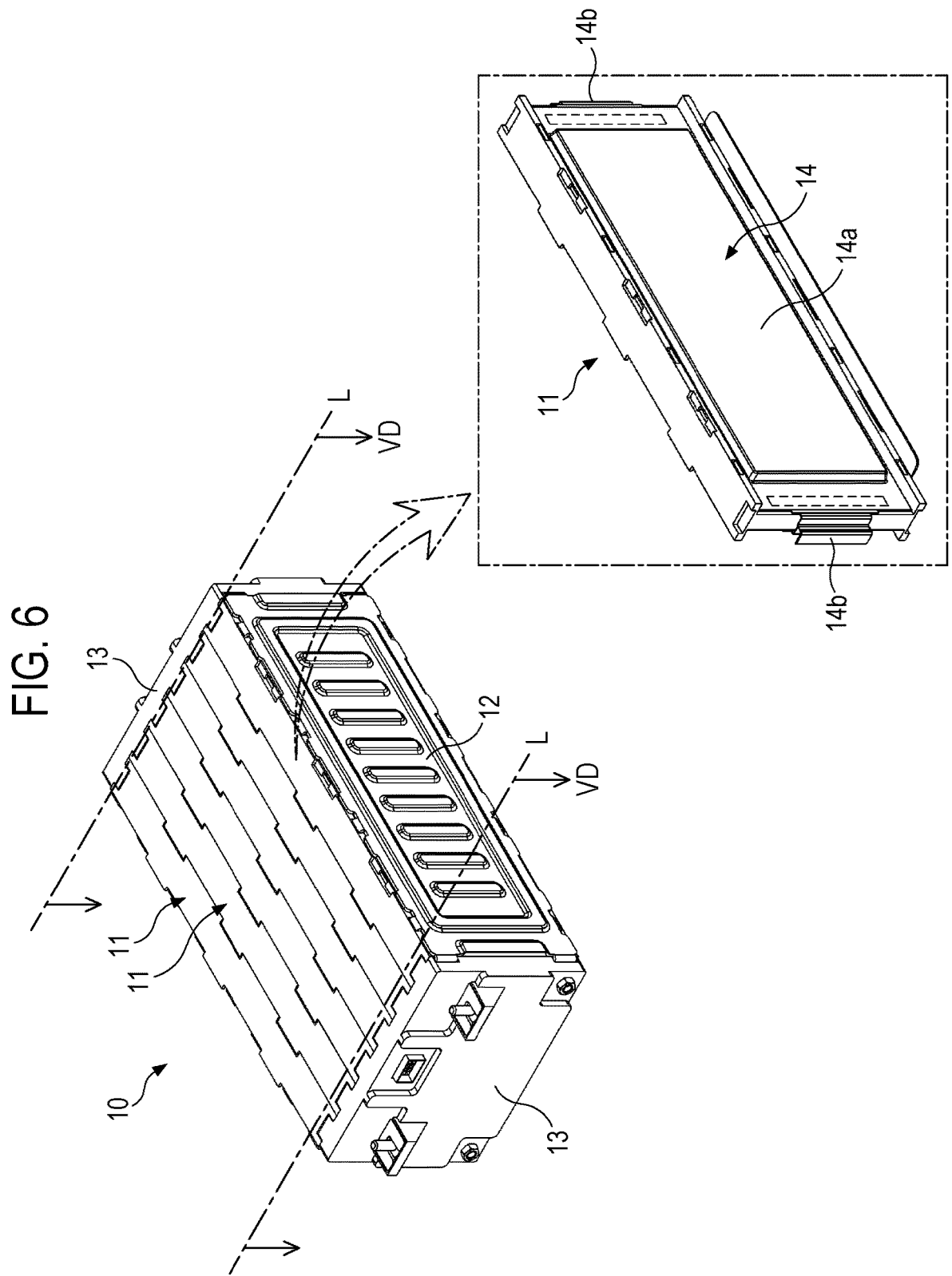
FIG. 6 is a view showing an automated battery disassembly method according to one embodiment.
Figure 7:
FIG. 7 shows photographs of components separated by the automated battery disassembly system.
Figure 7:
Figure 7:
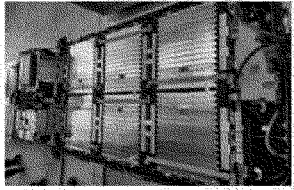
Figure 7:
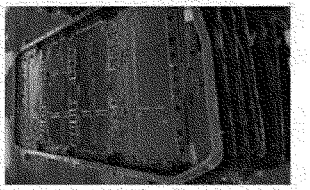
Figure 7:
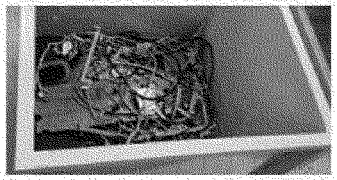
Figure 7:
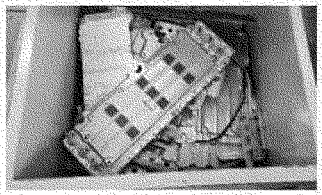
Figure 7:
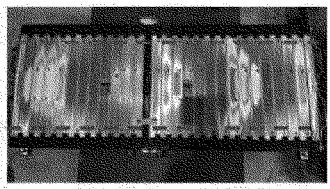
Figure 7:
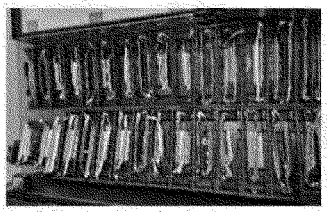
Figure 7:
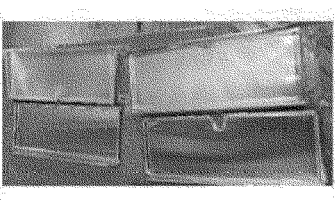
Figure 7:
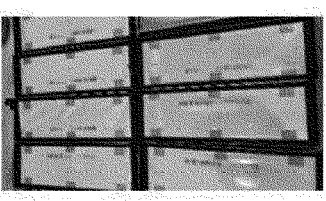
Figure 7:
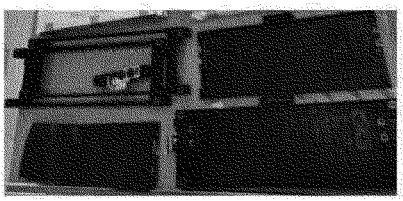
Figure 7:
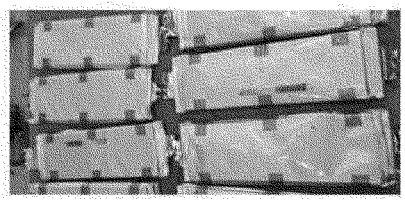

FIG. 4 is a flowchart for an automated battery disassembly method 200 in an embodiment. FIG. 5 is a flowchart for a fire monitoring process 290 performed at each worktable. FIG. 6 illustrates a disassembly method for the battery module in an embodiment. FIG. 7 shows photographs of components separated by the automated battery disassembly system. Hereinafter, the automated battery disassembly method 200 will be described using the components of the automated battery disassembly system 100 shown in FIGS. 1 to 3. However, it is not required that the automated battery disassembly method 200 shown in FIGS. 4 and 5 is necessarily performed using the automated battery disassembly system 100 shown in FIGS. 1 to 3.

The specific operations in the automated battery disassembly method 200 described below may be performed by the controller 170 of the automated battery disassembly system 100. The operations of the transfer device 120, the robot device 130, and the fire extinguishing device 160 may be controlled by the controller 170. For example, the operation of disassembling a specific component of the battery pack by the robot device 130 may be understood as that the controller 170 controlling the robot device 130 to disassemble a specific component of the battery pack. For another example, the operation of transferring the battery pack from the first worktable 111 to the second worktable 114 by the transfer device 120 may be understood as the controller 170 controlling the transfer device 120 to transfer the battery pack from the first worktable 111 to the second worktable 114.

The automated battery disassembly method 200 may include step 210 of providing a battery pack, step 220 of separating an upper cover from the battery pack, step 240 of discharging the battery pack, step 260 of separating a battery module from the battery pack, and step 280 of separating battery cells from the battery module. The above steps may be performed in different worktables. In this case, after a specific step is finished and before a subsequent step is performed, the battery pack or the battery module may be transferred to a worktable where the subsequent step is performed. However, the transfer between steps is not essential. For example, if two different steps can be performed at the same time on one worktable, the transfer between the two steps may be omitted.

The battery pack provided to the automated battery disassembly system 100 according to step 210 of providing the battery pack may be transferred to and placed in a waiting zone 101 by a transportation device (e.g., an automated guided vehicle (AGV)). The battery pack may be provided in a state of being disposed on a pallet, and the transportation device may move the battery pack and the pallet to the waiting zone 101. The transfer device 120 transfers the battery packs in the waiting zone 101 to the first worktable 111. The pallet on which the battery pack is disposed before the battery pack is connected to the transfer device 120 may be aligned at a specific position in the waiting zone 101 to facilitate the transfer by the transfer device 120.

(Separating the Upper Cover)

After the transfer device 120 transfers the battery pack to the first worktable 111, step 220 of separating the upper cover is performed. When the battery pack is disposed on the first worktable 111, the robot devices 131 and 132 check the top of the battery pack through the vision system 140, and use various tools such as a bolt driver and a laser cutter to separate the upper cover from the battery pack. Since the battery pack has various shapes depending on the manufacturer or model, the tool provided in the robot device 130 or the movement of the robot device 130 may be appropriately determined according to the shape of the battery pack. The upper cover separated from the battery pack may be transferred to and stacked in the upper cover storage box 31 through the transfer device 120.

(Transfer)

The battery pack that has gone through step 220 of separating the upper cover is subjected to step 240 of discharging the battery pack. As step 240 of discharging the battery pack is performed on the discharging worktable 112 or 113, step 230 of transferring the battery pack from the first worktable to the discharging worktable 112 or 113 may be performed.

(Discharging Step)

Step 240 of discharging the battery pack may include a first discharge step using the discharger 151 and a second discharge step using the short-circuiting discharge performed after the first discharge step.

After the battery pack from which the upper cover is separated is transferred to the first discharging worktable 112 by the transfer device 120, the fifth robot 135 may use a dedicated jig to separate a battery management system (BMS) from the battery back. The fifth robot 135 may use the vision system 140 and the dedicated jig to separate the BMS. When automatically separated by the fifth robot 135, the BMS may be transferred to and stored in a BMS storage box by the robot device 130.

When the separation of the BMS is completed, the robot device 130 may connect the battery pack to the discharger 151 to discharge the battery pack. The battery pack is connected to the discharger 151 and is discharged. The robot device 130 may connect the battery pack and the discharger 151 using a dedicated discharge jig. The battery pack may be connected to the discharger 151 and discharged until the battery pack is in a state of charge (SoC) at which the voltage of the battery pack becomes 30 V or less. For example, the discharging using the discharger may be performed for about 1 to 4 hours depending on the residual energy of the battery pack so that the voltage of the battery pack becomes 30V or less. After the battery pack is connected to the discharger 151 and the state of charge is checked, residual energy may be recovered and used as an auxiliary power source for the system 100.

When the battery pack is rapidly discharged by using the discharger 151, the voltage of the battery pack may rises again to, for example, 30 V or more. In this case, the battery pack may be connected to the discharger 151 again and discharged until the voltage of the battery pack is stabilized to 30 V or less. The additional discharging may be performed on the second discharging worktable 113 after the battery pack is transferred to the second discharging worktable 113.

The battery pack primarily discharged by the discharger 151 is coupled to the short-circuiting discharge jig by the fifth robot 135. When coupled to the short-circuiting discharge jig, the positive and negative terminals of the battery pack are short-circuited to each other. In that state, the battery pack may be transferred to and mounted on a short-circuiting discharge rack 22 by the transfer device 120. Even if the battery pack is discharged by the discharger 151, a certain amount of electric energy remains in the battery pack. Therefore, the stability of the subsequent disassembling step can be secured by performing short-circuiting discharge until the voltage of the battery pack becomes about 0.2 V or less. The battery pack may be short-circuit-discharged for a predetermined time, for example, 12 to 24 hours after being transferred to the short-circuiting discharge rack 22. The short-circuiting discharge rack 22 is composed of, for example, six 4-tier drawers. When the transfer device 120 transfers the battery pack to which the short-circuiting discharge jig is attached, a designated drawer in the short-circuiting discharge rack 22 is opened. The transfer device 120 may put a battery pack equipped with the short-circuiting discharge jig into the opened drawer.

The above-described discharging may be performed by the controller 190. The controller 190 may discharge the battery pack for 1 hour to 4 hours by using the discharger 151 according to the residual energy of the battery pack so that the voltage of the battery pack becomes 30 V or less. The controller 190 may additionally discharge the battery pack by using the discharger 151 when the voltage of the battery pack rises again after the battery pack is discharged by using the discharger 151. The controller 190 may discharge the battery pack by using the short-circuiting discharge jig so that the voltage of the battery pack becomes 0.2 V or less. Discharging the battery pack using the short-circuiting discharge jig means discharging the battery pack in a state in which the short-circuiting discharge jig is coupled to the battery pack.

After the discharging on the first discharging worktable 112 by the discharger 151 is finished, the battery pack may be temporarily placed on the second discharging worktable 113 before being transferred to the short-circuiting discharge rack 22. The short-circuiting discharge jig may be mounted on the battery pack when the battery pack is placed on the first discharging worktable 112 or the second discharging worktable 113.

(Transfer)

After step 240 of discharging the battery pack is performed, the battery pack undergoes step 260 of separating the battery module. Step 260 of separating the battery module is performed on the first worktable 111. Accordingly, before step 260 of separating the battery module is performed, step 250 of transferring the battery pack from the discharging worktable 112 or 113 to the first worktable 111 is performed. When the short-circuiting discharge is completed in step 240 of discharging the battery pack or when the complete discharge of the battery pack due to the short-circuiting discharge is confirmed, the transfer device 120 transfers the discharged battery pack from the short-circuiting discharge rack 22 to the first worktable 111.

(Separating the Battery Module)

Step 260 of separating the battery module from the battery pack may be performed on the first worktable 111. Before separating the battery module, the short-circuiting discharge jig, which was coupled to the battery pack in step 240 of discharging the battery pack, may be removed by the robot device 130. The removed short-circuiting discharge jig is transferred to and stored at a designated place.

When the battery pack is disposed on the first worktable 111, the first robot 131 may check a component to be disassembled using the vision system 140, and may use the bolt driver and the tongs to disassemble and remove various bolts, cables, and the like connected to the battery module in the battery pack. The second robot 132 may check a components to be disassembled by the vision system 140, and may disassemble and cut brackets, plastics, and the like using a laser cutting machine and a cutter. The disassembled and cut components may be classified by type and loaded into the dismantling box 34.

Inside the battery pack, battery modules may be disposed in two layers. In this case, first, the upper battery module disposed on the upper layer may be separated from the battery pack, and then the lower battery module disposed on the lower layer may be separated from the battery pack. After the battery module is separated, the remaining lower cover of the battery pack may be transferred to the lower cover storage box 32 by the transfer device 120.

The battery module may be separated from the battery pack after the cables and accessories connected to the battery module and the components for fixing the battery module to the battery pack are removed.

The transfer device 120 may clamp and transfer the battery module to the second worktable 114. A portion of the battery module transferred to the second worktable 114 may be cut by the third robot 133. The third robot 133 may cut a specific portion of the battery module after locating the cutting tool at an accurate position using the vision system 140.

The third robot 133 may use a cutting tool (e.g., a rotary saw) to cut both ends of the battery module so that battery cells disposed in the battery module are not cut. For example, referring to FIG. 6, the battery module 10 includes cell assemblies 11 arranged in one direction. The cell assembly 11 includes at least one battery cell 14 therein. That is, the battery module 10 includes a plurality of battery cells 14 arranged in one direction. The cell assemblies 11 are surrounded and fixed to each other by an end plate 12 and a cover frame 13. Each of the battery cells 14 includes a body 14a extending in a longitudinal direction perpendicular to the arrangement direction of the battery cells 14 and electrode leads 14b extending from longitudinal ends of the body 14a. An electrode assembly is disposed inside the body 14a. The electrode assembly is provided in the form of stacking positive electrode plates, negative electrode plates, and separators. The positive electrode plate and the negative electrode plate are connected to different electrode leads 14b. The cutting tool provided in the third robot 133 may cut the battery module 10 without cutting the body 14a of the battery cell 14. For example, when the battery module 10 is viewed from above, the cutting tool may cut the battery module 10 in the vertical direction (VD) along a line L extending in the arrangement direction of the battery cells 14 and passing through the outside of the body 14a of the battery cell 14. For example, when viewed from above the battery module 10, the line L may pass over the electrode lead 14*b* of the battery cell 14. As a result, the electrode leads 14*b* of the battery cells 14 may be exposed on the cut surface (see "cut portion of the battery module" in FIG. 7).

One or more second worktables 114 and one or more third robots 133 may be provided. For example, referring to FIG. 2, two second worktables 114 and two third robots 133 may be provided. Since it takes a relatively long time to cut both ends of the battery module, the disassembly speed of the battery pack can be increased by using two or more second worktables 114 and two or more third robots 133. For example, when the cutting operation for the battery module is in progress on one second worktable 114, the battery module on the first worktable 111 is transferred by the transfer device 120 to the other second worktable 114 and then cut by the third robot 133 installed near the other second worktable 114.

(Transfer)

The battery module separated on the second worktable 114 as described above goes through step 270 of transferring the battery module to the third worktable 115 by the transfer device 120.

(Separating the Battery Cells)

When the battery module is prepared on the third worktable 115, step 280 of separating the battery cells from the battery module is performed. When the battery module is loaded on the third worktable 115 by the transfer device 120, the battery module is centered on the third worktable 115 and then clamped. The battery module fixed to the third worktable 115 is disassembled by the fourth robot 134. The fourth robot 134 may check a target to be disassembled by the vision system 140 and may use a vacuum gripper and a dismantling jig mounted on the fourth robot 134 to remove plastics, a cell protection aluminum cover, and other unnecessary elements from the battery module and separate the battery cells. The battery cells are stored in the cell box 33 by the fourth robot 134. When a certain amount of battery cells is loaded into the cell box 33, a transportation device such as an AGV or the like automatically moves the cell box 33 to a storage space. The storage boxes (e.g., the upper cover storage box 31 and the lower cover storage box 32) for storing other components separated from the battery pack are also automatically moved to a designated place by the transportation device when the storage boxes are filled with a certain number of other components.

The separated battery cells go through a recycling process. For example, a process of extracting valuable metals or the like from the battery cells may be performed.

(Fire Monitoring)

The automated battery disassembly method 200 may include a fire monitoring step 290. Whether or not a fire occurs may be monitored while performing the battery pack disassembly process.

The fire monitoring step 290 includes step 291 of determining whether or not a fire has occurred in the battery pack or the battery module disposed on the worktable while performing step 220 of separating the upper cover from the battery pack, step 240 of discharging the battery pack, step 260 of separating the battery module from the battery pack, and step 280 of separating the battery cells from the battery module. If it is determined that a fire has occurred, the fire extinguishing device 160 is operated (292). For example, a fire may be extinguished by submerging the worktable in the water tank.

According to the present disclosure, in order to recycle the waste battery, the battery pack and the battery module are automatically disassembled by using automation devices such as the transfer device 120 and the robot device 130 instead of manual operations. As a result, it is possible to effectively recycle the battery pack of the electric vehicle, and it is possible to prevent or minimize exposure of workers to hazardous substances that may be generated during the disassembly of the battery.

Although the technical scope of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications and changes are intended to fall within the scope of the appended claims.

What is claimed is:

1. An automated battery disassembly system, comprising:
a workstation including a first worktable, a second worktable, a third worktable, and a discharging worktable;
a discharging device;
a robot device;
a transfer device; and
a controller electrically connected to the robot device and the transfer device,
wherein the controller is configured to control the robot device to:
when a battery pack is disposed on the first worktable, separate an upper cover from the battery pack;
when the battery pack is disposed on the discharging worktable, discharge the battery pack by connecting the battery pack to the discharging device;
when the discharged battery pack is disposed on the second worktable, separate a battery module from the discharged battery pack; and
when the battery module is disposed on the third worktable, separate battery cells from the battery module.

2. The system of claim 1, wherein the controller is configured to control the transfer device to:
after the separating the upper cover from the battery pack and before the discharging the battery pack, transfer the battery pack which is disposed on the first worktable and from which the upper cover is separated, to the discharging worktable;
after the discharging the battery pack and before the separating the battery module from the discharged battery pack, transfer the discharged battery pack disposed on the discharging worktable to the second worktable; and
after the separating the battery module from the discharged battery pack and before the separating the battery cells from the battery module, transfer the battery module disposed on the second worktable to the third worktable.

3. The system of claim 1, further comprising a fire extinguishing device including a water tank connected to the controller and configured to be filled with fire extinguishing water,
wherein the controller is configured to control the fire extinguishing device to accommodate the battery pack disposed on the workstation into the water tank.

4. The system of claim 1, further comprising a vision system electrically connected to the controller, wherein the controller is configured to disassemble components of the battery pack disposed on the workstation by controlling the robot device based on data obtained through the vision system.

5. The system of claim 1, further comprising a storage box,
wherein the controller is configured to control the robot device to move the components separated from the battery pack to the storage box.

6. The system of claim 1,
wherein the discharging device includes a discharger and a short-circuiting discharge jig, and
wherein the controller is configured to control the robot device to connect the battery pack disposed on the discharging worktable to the discharger to discharge the battery pack, and then control the robot device to connect the battery pack to the short-circuiting discharge jig to short-circuit-discharge the battery pack.

7. The system of claim 6, wherein the controller is configured to discharge the battery pack by using the discharger for 1 hour to 4 hours according to a residual energy of the battery pack so that a voltage of the battery pack is 30 V or less, and to discharge the battery pack by using the short-circuiting discharge jig so that the voltage of the battery pack is 0.2 V or less.

8. The system of claim 1,
wherein the battery module includes a plurality of battery cells arranged in a first direction, each of the battery cells including a body extending in a longitudinal direction perpendicular to the first direction and electrode leads extending from longitudinal ends of the body, and
wherein the separating the battery cells from the battery module includes cutting the battery module along a line parallel to the first direction and passing over the electrode leads when the battery module is viewed from above.

* * * * *